US011205772B1

(12) United States Patent
Gordon et al.

(10) Patent No.: US 11,205,772 B1
(45) Date of Patent: Dec. 21, 2021

(54) ZINC ELECTRODE MANUFACTURING

(71) Applicant: ZAF ENERGY SYSTEMS, INCORPORATED, Bozeman, MT (US)

(72) Inventors: Michael J. Gordon, Joplin, MO (US); Shiloh J. Williams, Joplin, MO (US); Allen Charkey, Winter Haven, FL (US); Andrew Souder, II, Joplin, MO (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 17/319,716

(22) Filed: May 13, 2021

(51) Int. Cl.
*H01M 4/04* (2006.01)
*H01M 4/48* (2010.01)
*H01M 4/38* (2006.01)
*H01M 4/62* (2006.01)
*H01M 4/02* (2006.01)

(52) U.S. Cl.
CPC ....... *H01M 4/0435* (2013.01); *H01M 4/0471* (2013.01); *H01M 4/38* (2013.01); *H01M 4/48* (2013.01); *H01M 4/623* (2013.01); *H01M 2004/027* (2013.01)

(58) Field of Classification Search
CPC .... H01M 4/0435; H01M 4/0471; H01M 4/38; H01M 4/48; H01M 4/623; H01M 2004/027
See application file for complete search history.

(56) References Cited

U.S. PATENT DOCUMENTS

| | | | |
|---|---|---|---|
| 3,530,001 A * | 9/1970 | Harivel | H01M 4/64 429/94 |
| 3,898,099 A * | 8/1975 | Baker | H01M 4/0435 252/182.1 |
| 4,983,264 A | 1/1991 | Miyake et al. | |
| 5,435,874 A | 7/1995 | Takeuchi et al. | |
| 6,032,075 A | 2/2000 | Pignato et al. | |
| 6,171,723 B1 | 1/2001 | Loch et al. | |
| 2005/0260492 A1 | 11/2005 | Tucholski et al. | |
| 2008/0221629 A1 | 9/2008 | Morgan et al. | |
| 2013/0260222 A1 | 10/2013 | Lu et al. | |
| 2015/0155568 A1 | 6/2015 | Sumioka | |
| 2015/0287546 A1 | 10/2015 | Xi et al. | |
| 2017/0200923 A1 | 7/2017 | Weinstein et al. | |

(Continued)

FOREIGN PATENT DOCUMENTS

DE 102017201233 A1 7/2018

*Primary Examiner* — Andrew J. Oyer
(74) *Attorney, Agent, or Firm* — Brooks Kushman P.C.

(57) ABSTRACT

A method for manufacturing zinc negative electrodes includes mixing a powder including zinc with polytetrafluoroethylene to form a homogenous blend, injecting a lubricant into the homogenous blend to form a dough, kneading the dough to form a fibrillated dough, and extruding the fibrillated dough through a die to form a ribbon. The method also includes calendering the ribbon to a target thickness to form a plaque, drying the plaque to form an active material sheet, laminating portions of the active material sheet to a current collector substrate such that the current collector substrate is sandwiched between the portions to form an electrode blank, and sectioning the electrode blank into zinc negative electrodes.

8 Claims, 9 Drawing Sheets

(56) References Cited

U.S. PATENT DOCUMENTS

| | | |
|---|---|---|
| 2017/0294650 A1 | 10/2017 | Marple |
| 2017/0362717 A1 | 12/2017 | Hattori et al. |
| 2018/0166665 A1 | 6/2018 | Audebert et al. |
| 2019/0267597 A1* | 8/2019 | Gonda ................. H01M 50/46 |
| 2020/0028156 A1 | 1/2020 | Zhang et al. |
| 2020/0083541 A1 | 3/2020 | Swiegers et al. |

* cited by examiner

ZINC ELECTRODE MANUFACTURING

TECHNICAL FIELD

This application relates to the manufacturing of battery components.

BACKGROUND

Electrodes are typically electrical conductors that contact non-metallic circuit parts. Batteries can include one or more electrodes to facilitate proper operation.

SUMMARY

A method for manufacturing zinc negative electrodes includes mixing a powder including zinc with polytetrafluoroethylene to form a homogenous blend, injecting a lubricant into the homogenous blend to form a dough, kneading the dough to form a fibrillated dough, and extruding the fibrillated dough through a die to form a ribbon. The method further includes calendering the ribbon to a target thickness to form a plaque, drying the plaque to form an active material sheet, laminating portions of the active material sheet to a current collector substrate such that the current collector substrate is sandwiched between the portions to form an electrode blank, and sectioning the electrode blank into zinc negative electrodes.

DETAILED DESCRIPTION

Figure 1:
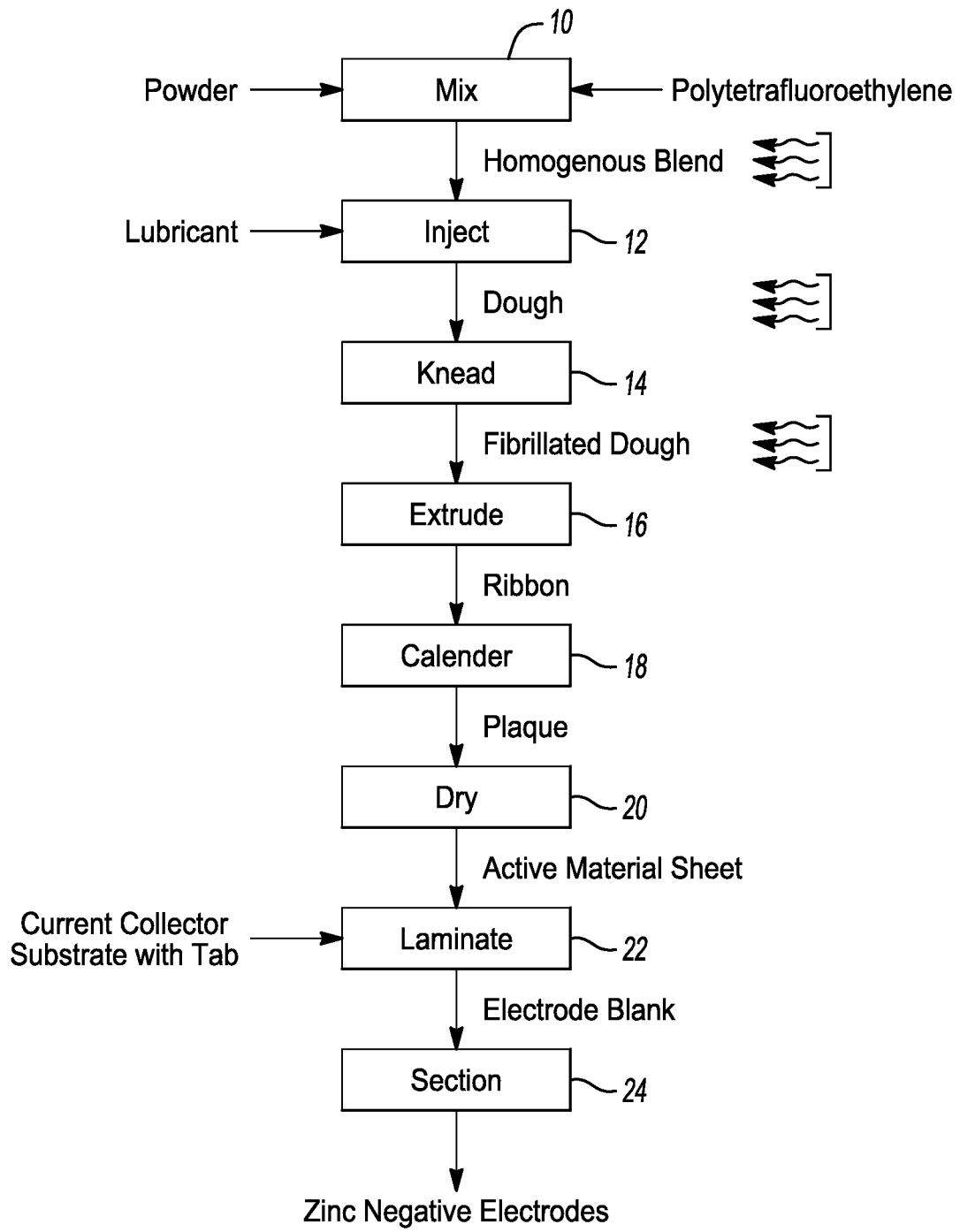
FIG. 1 is a flow chart of electrode manufacturing operations.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Processes for making zinc anodes on a large scale are contemplated herein. Generally speaking, anode powder may initially be mixed in a blender and then sent to a fibrillation machine and laminating/cutting machine. The fibrillation machine may include a kneader/extruder that mixes the anode powder with mineral spirits, fibrillates it, and extrudes it into a continuous ribbon. This ribbon may then be continuously fed into a calender with a single set of calender rolls or a series of sets of calender rolls to reach the desired thickness. The continuously calendered plaque may then be continuously dried in an oven and finally rolled up on a reel in a rewinder.

In one example, premixed anode powder, including combinations of calcium zincate, metallic zinc, zinc oxide, nucleation additives (e.g., bismuth, cadmium, lead, mercury, tin, and zinc) and hydrogen suppressing additives (e.g., bismuth, cadmium, indium, lead, mercury, tin, and zinc), absorbent additives, and/or zinc stabilization additives, is added to a hopper and fed into an extruder. A lubricant is added through an injection port. The material in the extruder is then heated to approximately 50° C. The extruder also kneads the material to fibrillate it. Using a split annular die, the material is extruded as a ribbon. The ribbon exiting the kneader/extruder is fed directly into a calender with one or more sets of rolls to form a continuous plaque of the desired thickness and width. After calendering, the continuous plaque is sent through a drying oven to remove the lubricant, and wound onto a roll at a rewind station. Upon completion of the run, the roll of active material sheet is transferred to a laminating/cutting machine for final processing.

The laminating/cutting machine includes three de-reelers that uncoil two rolls of anode plaque and one roll of perforated copper substrate with tabs. The plaque is fed into another calender with the copper substrate in-between to laminate them together. After the laminating calender, continuously pressed electrode blanks are cut into individual zinc negative electrodes with a rotatory cutter and then put onto a shingling conveyor for operator removal.

The above is more generally described in FIG. 1. At operation 10, powder (e.g., zinc oxide, calcium zincate, metallic zinc, nucleation and hydrogen suppressing additives, absorbent additives, and/or zinc stabilization additives) and polytetrafluoroethylene are mixed to form a homogenous blend. At operation 12, the homogeneous blend is injected with lubricant (e.g., butanol, ethanol, mineral spirits, or xylene) to form a dough. At operation 14, the dough is kneaded to form a fibrillated dough. At operation 16, the dough is extruded through a dye to form a ribbon. At operation 18, the ribbon is calendered to a target thickness to form a plaque. At operation 20, the plaque is dried to form an active material sheet. At operation 22, portions of the active material sheet are laminated to a current collector substrate including a tab such that the current collector substrate is sandwiched between the portions to form an electrode blank. And at operation 24, the electrode blank is sectioned into zinc negative electrodes. Some or all of these operations may be performed in continuous fashion. As a result, the plaque and/or ribbon may be continuous. Also, heat may be applied to any of the homogenous blend, dough, or fibrillated dough.

Figure 2:
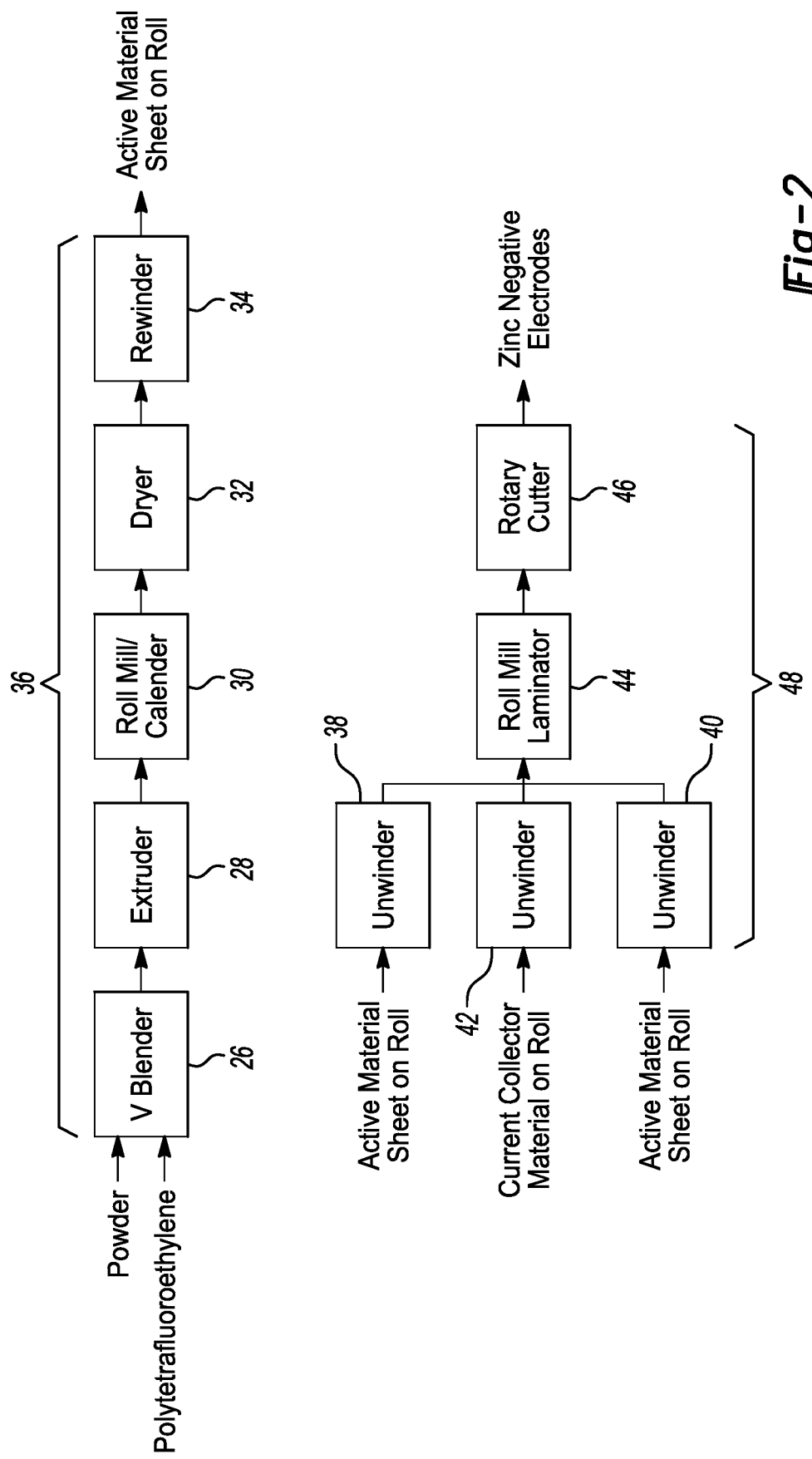
FIGS. 2-4 are block diagrams of processing arrangements for manufacturing electrodes.

Variations on the above theme are also contemplated. Referring to FIG. 2, stations are arranged to perform at least some of the operations described above. Intermediate stations between those shown may be omitted for purposes of clarity. A V-blender 26, extruder 28, roll mill/calender 30, dryer 32, and rewinder 34 are arranged in a sequential processing stream 36. Anode powder and polytetrafluoroethylene are inputs to the sequential processing stream 36, and a roll of active material sheet is the output.

Unwinders 38, 40, 42, a roll mill laminator 44, and rotary cutter 46 are arranged in a sequential processing stream 48. The unwinders 38, 40, 42 are in parallel. Inputs to the sequential processing stream 48 are rolls of active material sheets (for the unwinders 38, 40) and a roll of current collector material (for the unwinder 42), and zinc negative electrodes are the output.

Figure 3:
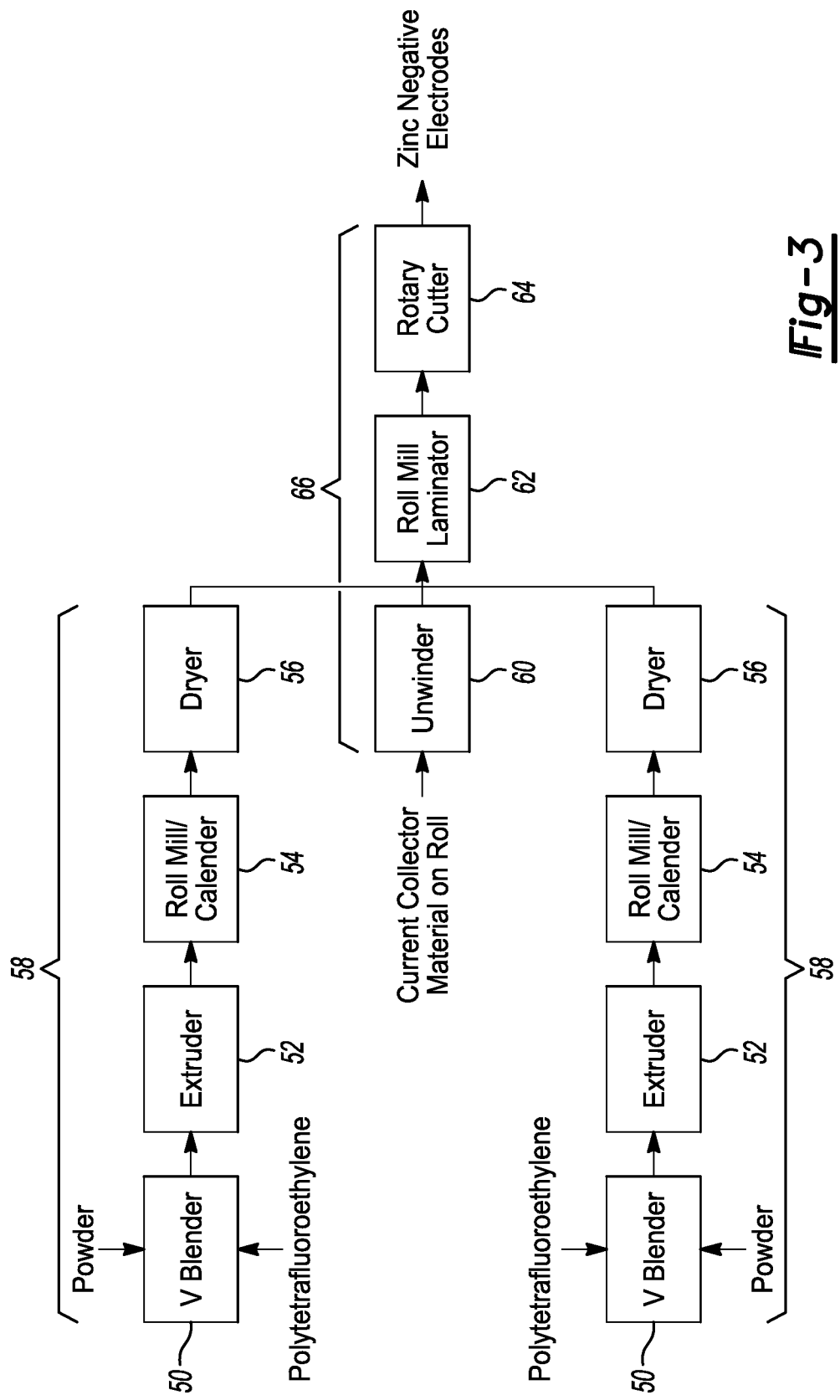

Referring to FIG. 3, V-blenders 50, extruders 52, roll mills/calenders 54, and dryers 56 are arranged in parallel sequential processing streams 58. Unwinder 60, roll mill/calender 62, and rotary cutter 64 are arranged in a sequential processing stream 66. Powder and polytetrafluoroethylene are inputs to the parallel sequential processing streams 58. A roll of current collector material is input to the sequential processing stream 66. Outputs from the parallel sequential processing streams 58 are also input to the roll mill/calender 62 of the sequential processing screen 66. Outputs of the parallel sequential processing stream 66 are zinc negative electrodes.

Figure 4:
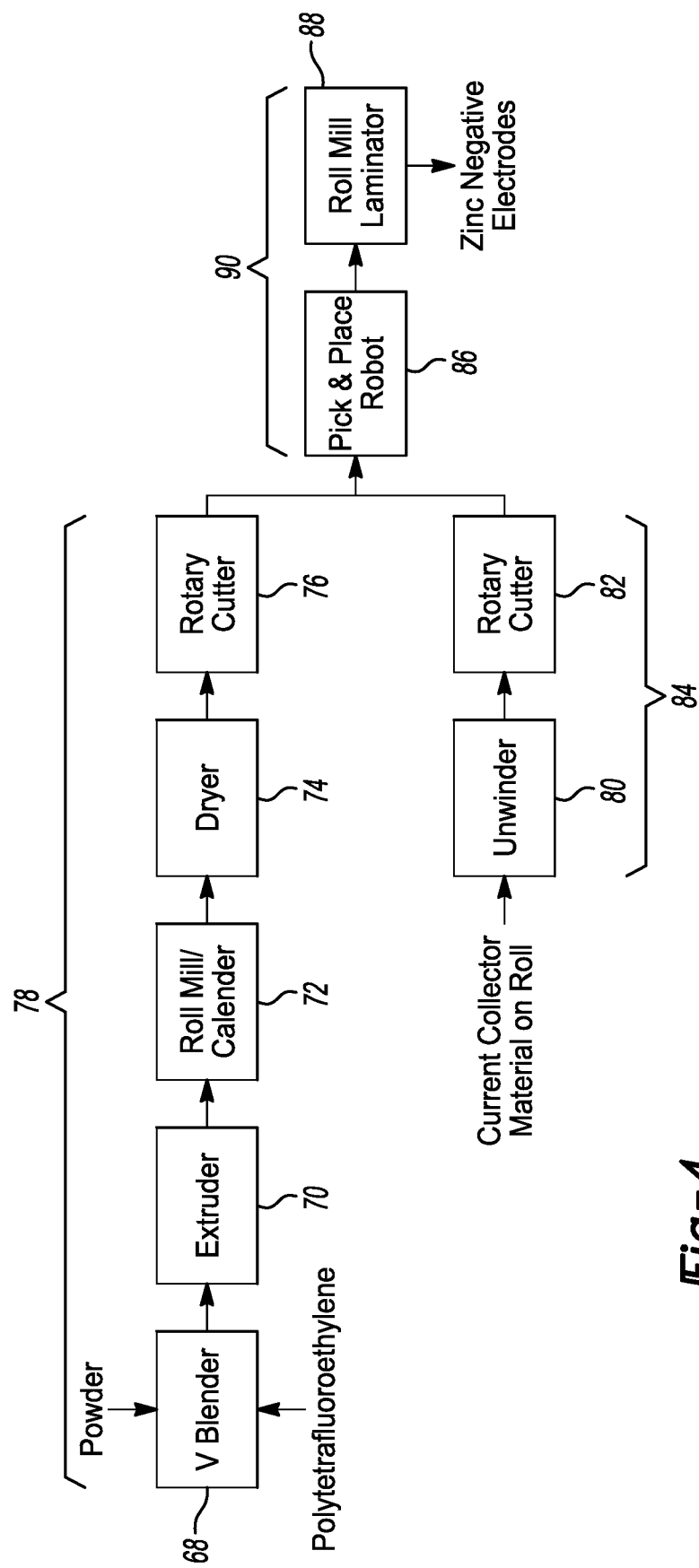

Referring to FIG. 4, a V-blender 68, extruder 70, roll mill/calender 72, dryer 74, and rotary cutter 76 are arranged in a sequential processing stream 78. Unwinder 80 and rotary cutter 82 are arranged in a sequential processing stream 84. And, pick and place robot 86 and roll mill laminator 88 are arranged in a sequential processing stream 90. Powder and polytetrafluoroethylene are inputs to the sequential processing stream 78. A roll of current collector material is input to the sequential processing stream 84. Outputs from the sequential processing streams 78, 84 are inputs to the sequential processing stream 90. Zinc negative electrodes are the output from the sequential processing stream 90.

Figure 5:
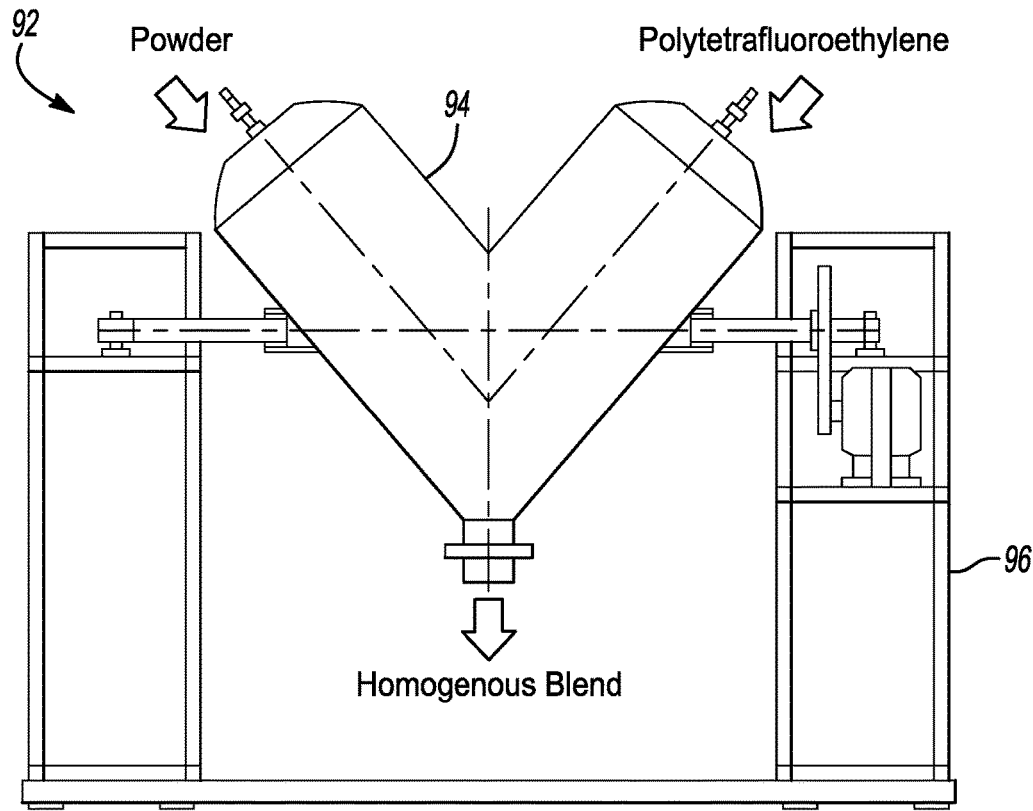
FIG. 5 is a schematic diagram of a V-blender.

Referring to FIG. 5, V-Blender 92 includes a blender 94 mounted on a stand 96. Powder and polytetrafluorethylene are added to the blender 94. Homogenous blend results.

Figure 6:
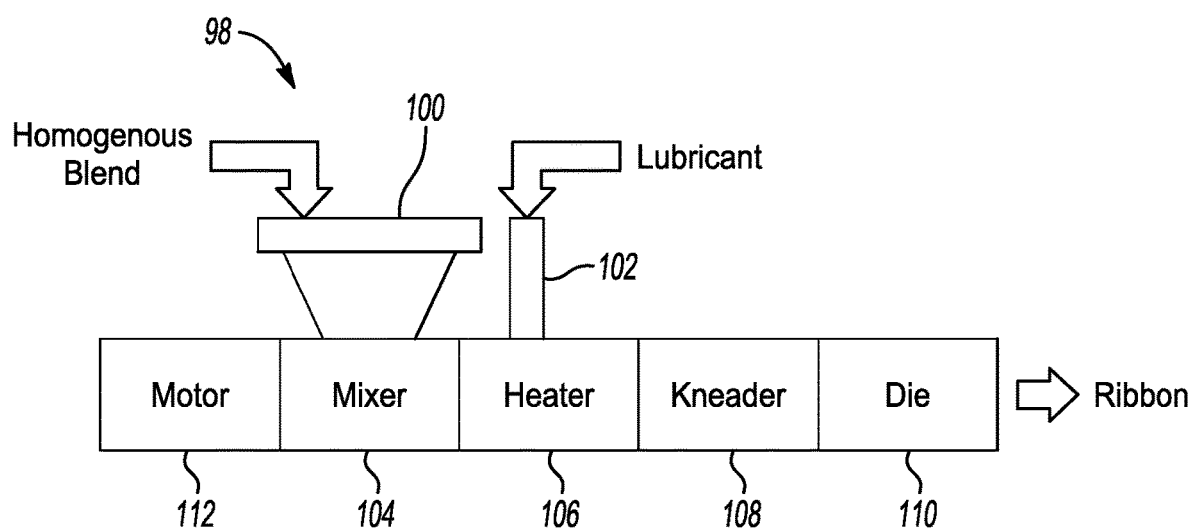
FIG. 6 is a schematic diagram of a mixer, heater, and kneader.

Referring to FIG. 6, apparatus 98 includes a hopper 100, injection port 102, mixer 104, heater 106, kneader 108, die 110, and motor 112. The hopper 100 and injection port 102 allow materials, such as the homogenous blend and lubricant respectively, to be added to the mixer 104 and heater 106 respectively. The mixer 104 and kneader 108 are driven by the motor 112. The kneader forces the material through the die 110 to form ribbon.

Figure 7:
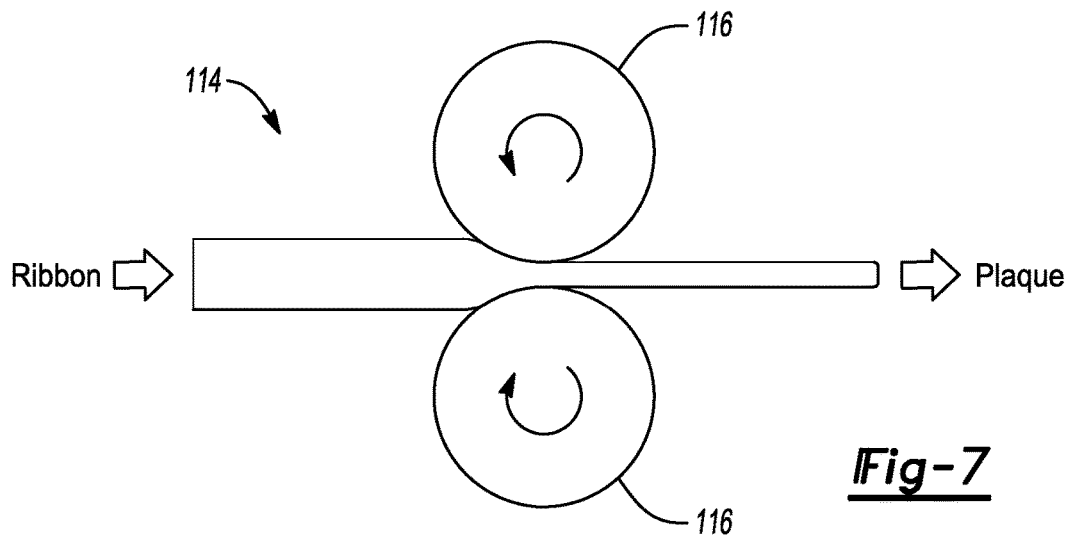
FIG. 7 is a schematic diagram of a calender.

Referring to FIG. 7, calender 114 includes a pair of rollers 116 that roll the ribbon to decrease its thickness, resulting in plaque.

Figure 8:
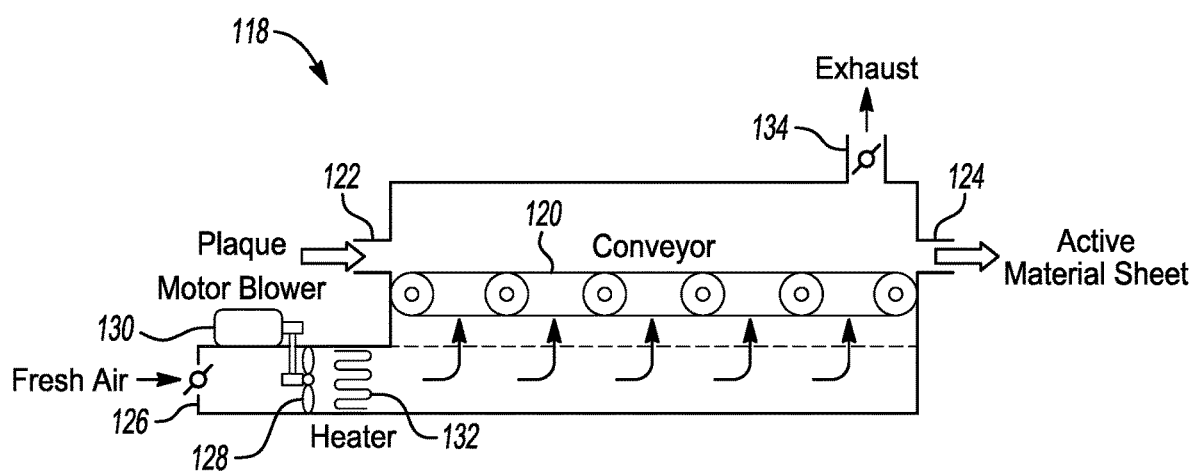
FIG. 8 is a schematic diagram of a dryer.

Referring to FIG. 8, dryer 118 includes conveyor 120, entrance 122, exit 124, inlet port 126, fan 128, motor blower 130, heater 132, and exhaust port 134. Plaque is provided to the dryer 118 via the entrance 122. Air from the inlet port 126 is directed through the conveyor 120 and over the material thereon to the exhaust port 134 by operation of the fan 128 and motor blower 130. The heater 132 heats the air to speed the drying process. Active material sheet exits the dryer 118 via the exit 124.

Figure 9:
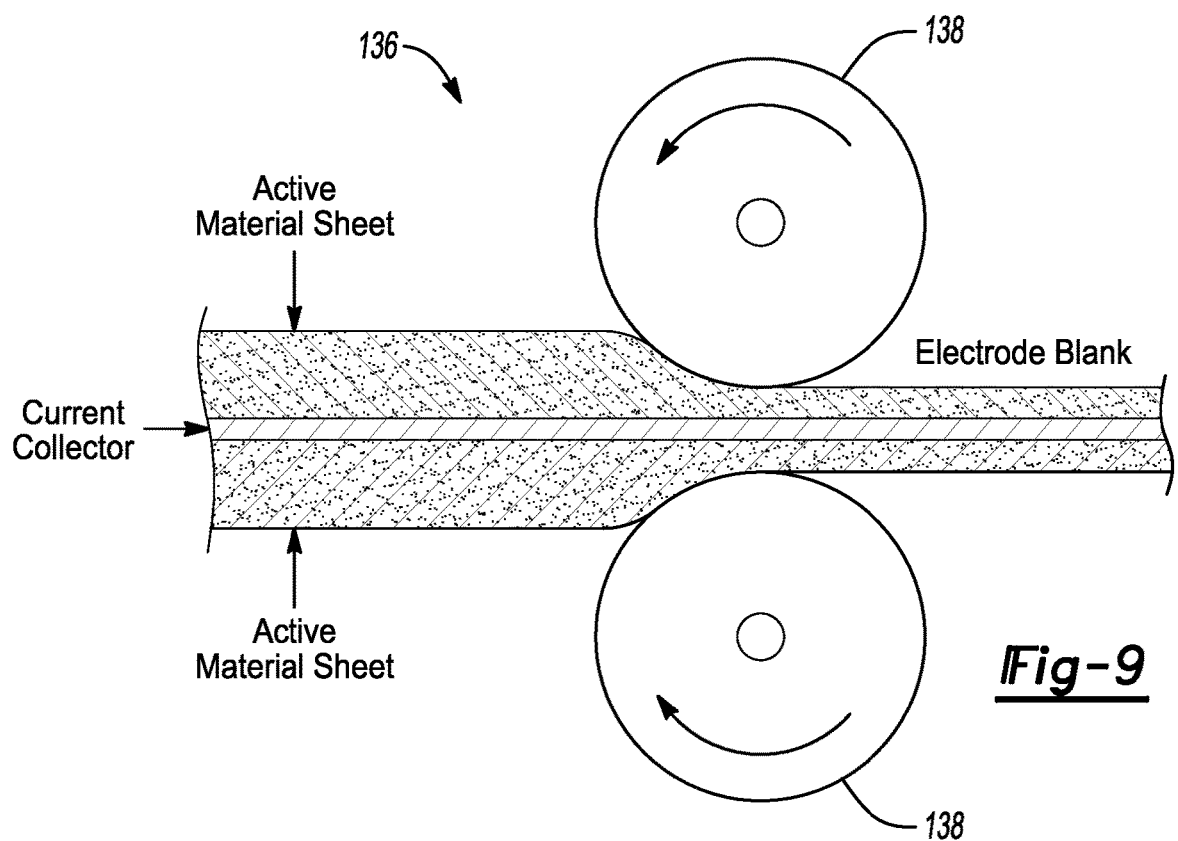
FIG. 9 is a schematic diagram of a laminator.

Referring to FIG. 9, laminator 136 includes rolls 138. A current collector sheet and active material sheets are laminated together via operation of the rolls 138 to form electrode blank.

Figure 10:
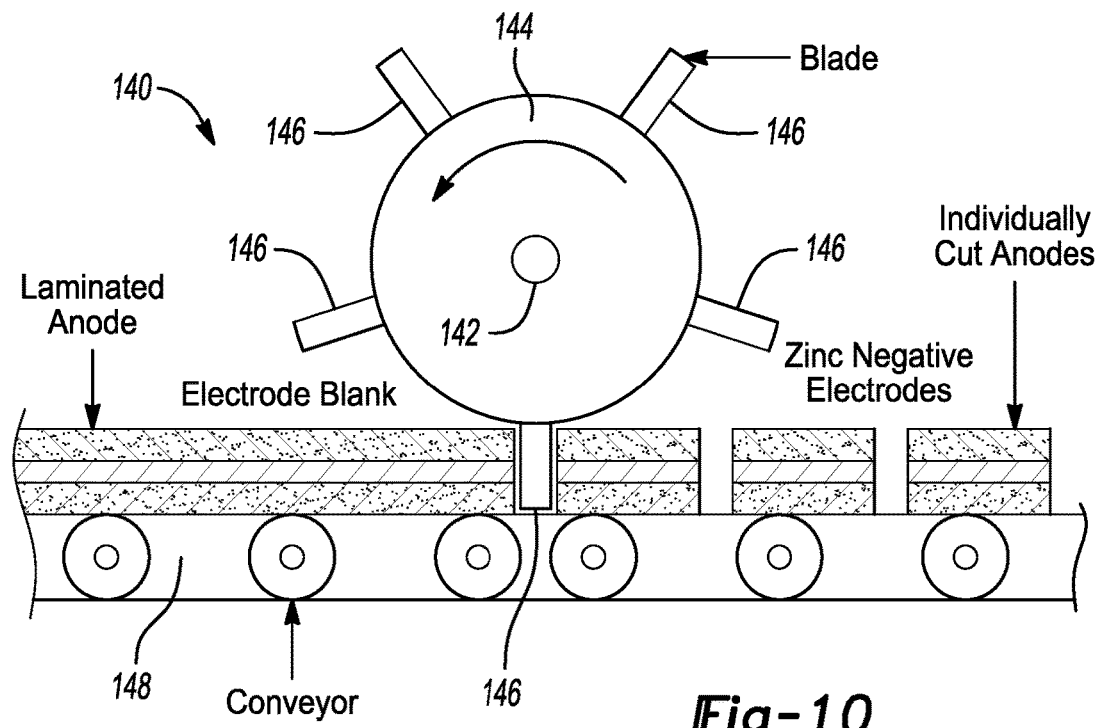
FIG. 10 is a schematic diagram of a cutter.

Referring to FIG. 10, cutter 140 includes shaft 142, cylinder 144, blades 146, and conveyor 148. The cylinder 144 is mounted on the shaft 142. The blades 146 are mounted around the cylinder 144. Rotation of the shaft 142 causes the blades 146 to section the electrode blank as it is fed thereto by the conveyor 148.

Figure 11:
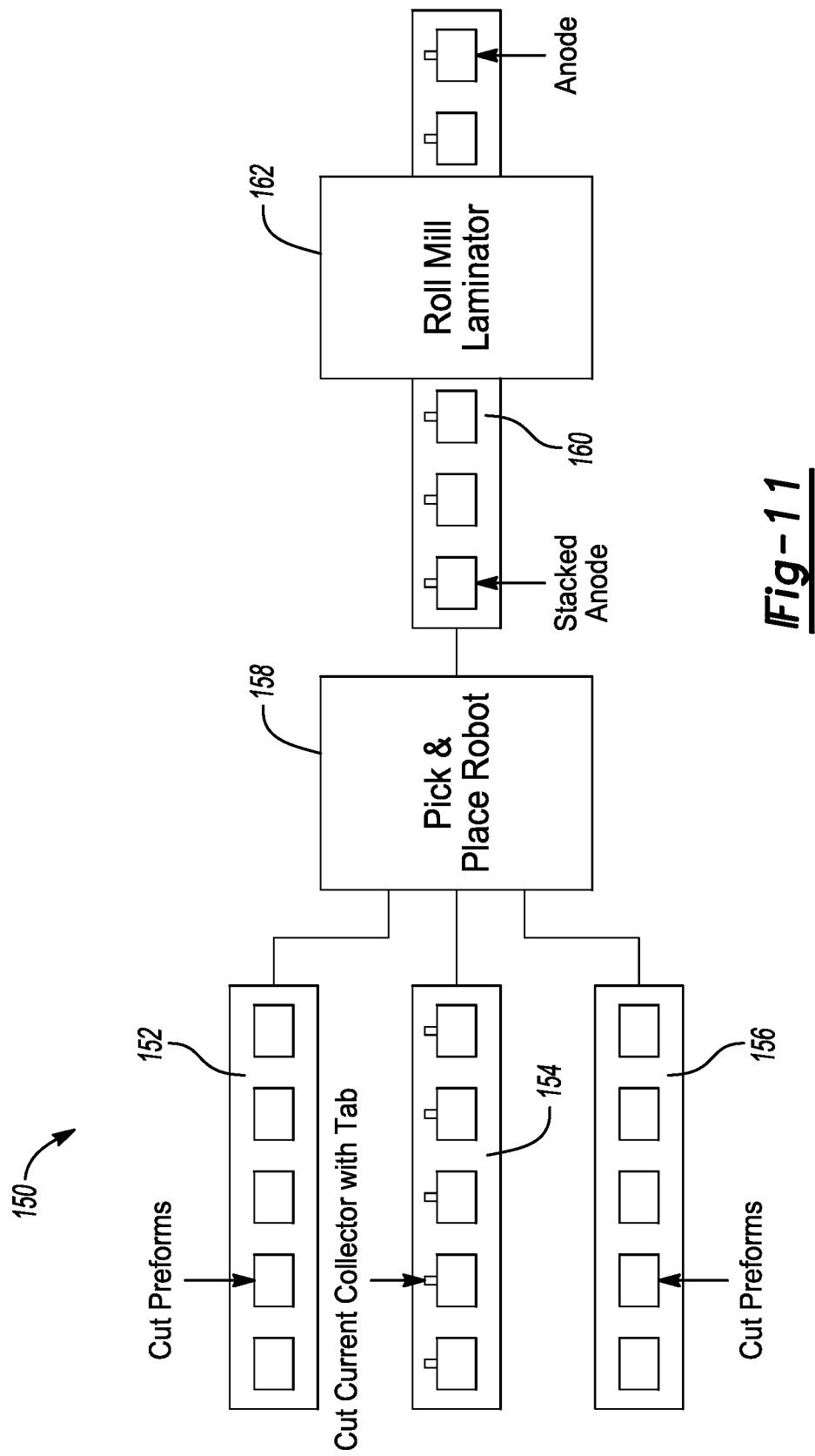
FIG. 11 is a schematic diagram of a conveyor, robot, and laminating roll mill arrangement.

Referring to FIG. 11, apparatus 150 includes conveyors 152, 154, 156, pick and place robot 158, conveyor 160, and laminating roll mill 162. The conveyors 152, 156 carry cut active material sheet preforms to the pick and place robot 158. The conveyor 154 carries cut current collector substrates with tabs to the pick and place robot 158. The pick and place robot 158 assembles the cut active material sheets and cut current collector substrates such that each cut current collector substrate is sandwiched between a pair of active material sheets. The pick and place robot 158 places these arrangements on the conveyor 160 for delivery to and through the laminating roll mill 162, which laminates the arrangements together—resulting in zinc negative electrodes.

Figure 12:
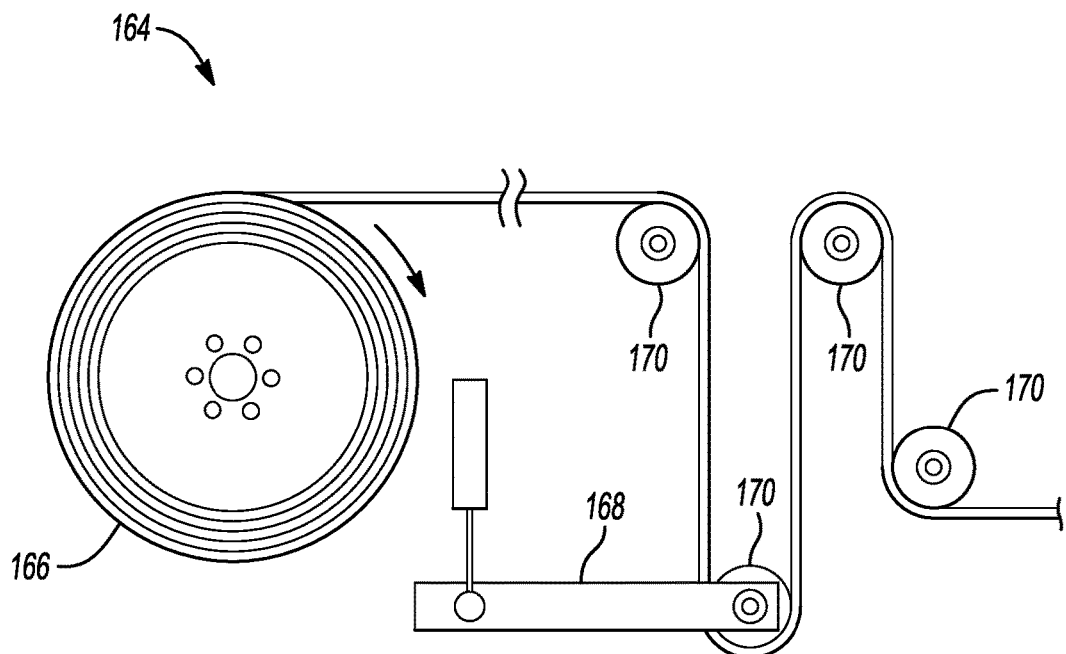
FIG. 12 is a schematic diagram of a winder/unwinder.

Referring to FIG. 12, winder/unwinder 164 includes a roll 166, dancer arm 168, and various guide rollers 170. Materials, such as those contemplated herein, may be wound to or unwound from the winder/unwinder 164 depending on its direction of rotation.

Figure 13:
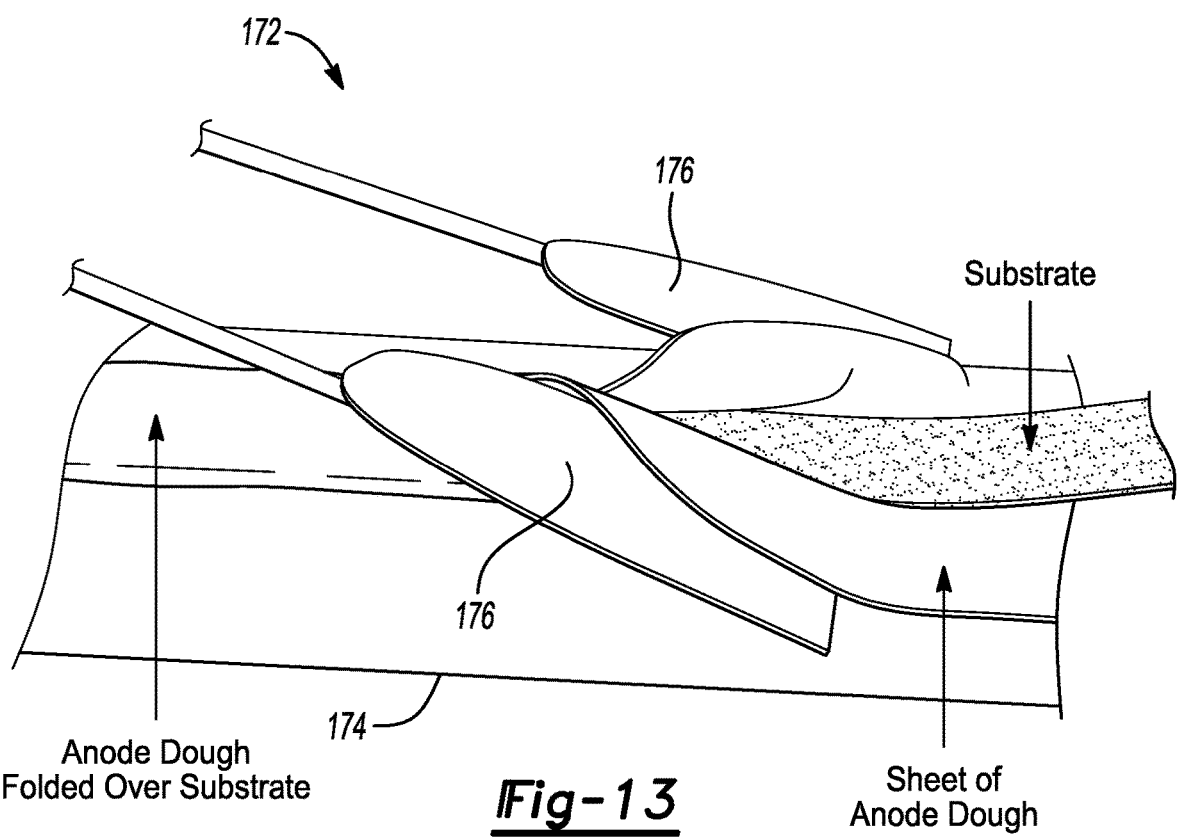
FIG. 13 is a schematic diagram of a folder.

In certain circumstances, a single active material sheet may be folded around a current collector substrate prior to lamination. Referring to FIG. 13, a folder 172 includes a conveyor 174 and paddles 176. The conveyor 174 carries a single wide active material sheet with a narrower current collector substrate thereon. The paddles 176 are spaced such that portions of the active material sheet on opposite sides of the current collector substrate ride up the paddles 176 and fold over opposite edges of the current collector substrate and overlap, encasing the current collector substrate therein. Other folding techniques, however, are also possible.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method for manufacturing zinc negative electrodes, comprising:
   by an extruder configured to receive powder that includes zinc with polytetrafluoroethylene and output a continuous ribbon,
   mixing the powder to form a homogenous blend
   injecting a lubricant into the homogenous blend to form a dough,
   kneading the dough to form a fibrillated dough, and
   extruding the fibrillated dough through a die to form the continuous ribbon;
   by calender rollers, calendering the continuous ribbon to a target thickness to form a continuous plaque;
   by a dryer, drying the continuous plaque to form an active material sheet, wherein the continuous ribbon, continuous plaque, and active material sheet define a continuum having a ribbon portion, a plaque portion, and an active material sheet portion;
   by a laminating machine, laminating portions of the active material sheet to a current collector substrate such that the current collector substrate is sandwiched between the portions to form an electrode blank; and
   by a cutting machine, sectioning the electrode blank into zinc negative electrodes.

2. The method of claim 1 further comprising, by a folder, folding the active material sheet around the current collector substrate.

3. The method of claim 1 further comprising, by a folder, folding the active material sheet around opposite edges of the current collector substrate such that opposite edges of the active material sheet overlap.

4. The method of claim 1, wherein the zinc is calcium zincate.

5. The method of claim 1, wherein the zinc is zinc oxide.

6. The method of claim 1, wherein the zinc is metallic zinc.

7. The method of claim 1, wherein the current collector substrate includes a tab.

8. The method of claim 1 further comprising, by a heater, heating the homogenous blend, dough, or fibrillated dough.

* * * * *